No. 753,830. PATENTED MAR. 1, 1904.
H. LEMM.
ADJUSTABLE HOE AND PLANT FENDER.
APPLICATION FILED OCT. 19, 1903.
NO MODEL.
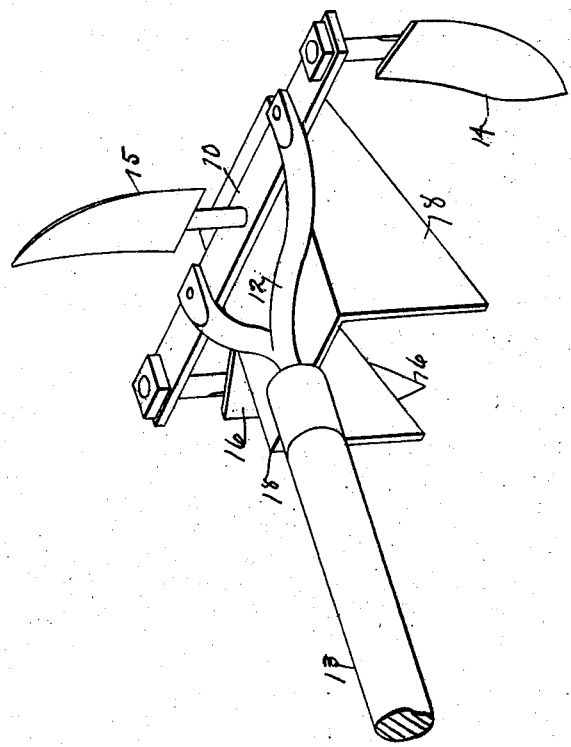

No. 753,830. Patented March 1, 1904.

UNITED STATES PATENT OFFICE.

HIRAM LEMM, OF STORM LAKE, IOWA.

ADJUSTABLE HOE AND PLANT-FENDER.

SPECIFICATION forming part of Letters Patent No. 753,830, dated March 1, 1904.

Application filed October 19, 1903. Serial No. 177,713. (No model.)

*To all whom it may concern:*

Be it known that I, HIRAM LEMM, a citizen of the United States, residing at Storm Lake, in the county of Buena Vista and State of Iowa, have invented a new and useful Adjustable Hoe and Plant-Fender, of which the following is a specification.

My object is to provide a simple, strong, durable, and transformable hoe especially adapted for cultivating plants by hand and to prevent small plants from being disturbed or covered and damaged by loose ground falling upon them.

My invention consists in the construction and combination of parts, as hereinafter set forth, pointed out in my claim, and illustrated in the accompanying drawing, in which—

The numeral 10 designates a hoe-head in the form of a straight bar about eight inches long, and 12 a forked metal handle fixed to the head to extend forward at right angles. The end of this iron handle is preferably screw-threaded and adapted to be fixed in a bore in the wooden extension 13. The head 10 has three screw-threaded apertures or screw-seats adapted for receiving the screw-threaded shank or top ends of cultivator shovels or teeth 14 and 15 and 16, as shown in the figure, to be securely fixed and locked by nuts 17, placed on the ends of the screws, as required to produce a complete hoe. The center shovel or tooth 15 is placed on the head 10 in an inverted position, and a plant-fender 18, made of a piece of sheet metal having its side portions bent at right angles and provided with an aperture in its center, is put in place of the center shovel and fixed to the head 10 by extending the screw end of the shovel through the head and the aperture in the fender and fastening the parts together by the nut on the under side of the fender, as shown and as required for advantageously operating the hoe astride a row of plants and protecting the plants from injury. The center shovel or tooth projecting upward can be advantageously used for making a furrow in which to plant seeds and also used as a hook for putting seed or other obstructions out of the way when necessary to do so.

It is obvious the form and size of the shovels or teeth may vary and that they can be readily adjusted to throw ground toward or away from a row of plants.

Having thus described the purpose of my invention, its construction, and the manner of using it in different ways, the practical utility thereof will be readily understood by gardeners and others familiar with the use of hoes; and

What I claim as new, and desire to secure by Letters Patent, is—

A hoe consisting of a straight head having a handle fixed thereto and shovels at its end portions and a plant-fender detachably fixed at its center to the center of said straight head and a shovel detachably fixed to the center of the straight head to project upward, arranged and combined as shown and described for the purposes stated.

HIRAM LEMM.

Witnesses:
CHAS. F. AIKIN,
W. A. JONES.